Figure 1:
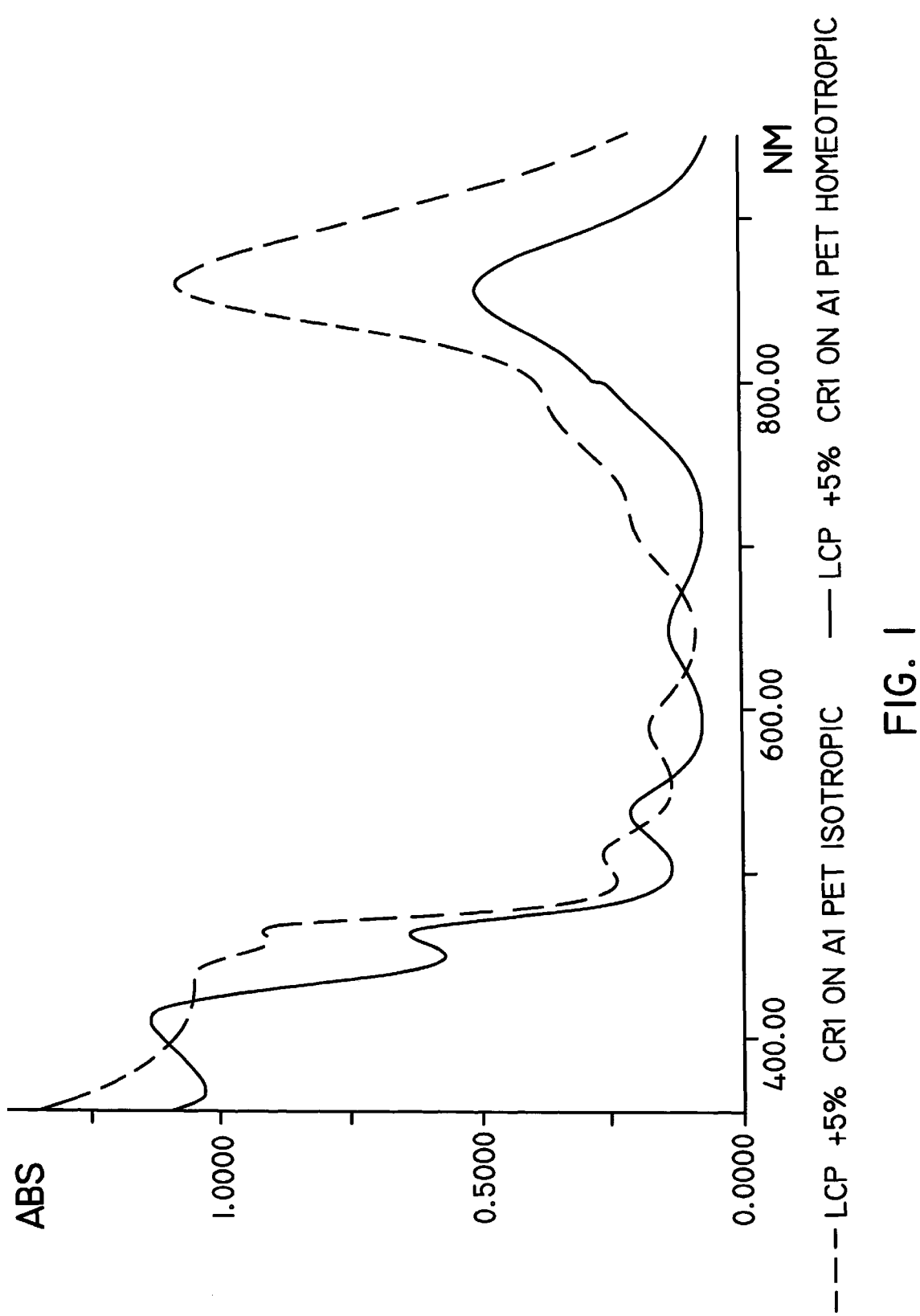

United States Patent [19]

Picken

[11] Patent Number: 5,976,638
[45] Date of Patent: Nov. 2, 1999

[54] OPTICAL RECORDING MEDIUM COMPRISING A HOMEOTROPICALLY ORIENTED LIQUID CRYSTALLINE POLYMER FILM COMPRISING DICHROIC DYE

[75] Inventor: Stephen J. Picken, Arnhem, Netherlands

[73] Assignee: Akzo Nobel NV, Arnhem, Netherlands

[21] Appl. No.: 08/535,434

[22] Filed: Sep. 28, 1995

Related U.S. Application Data

[63] Continuation-in-part of application No. 08/186,192, Jan. 24, 1994, abandoned.

[30] Foreign Application Priority Data

Jan. 26, 1993 [NL] Netherlands ............................ 9300147

[51] Int. Cl.[6] ................................................. C09K 19/00
[52] U.S. Cl. .......................... 428/1; 428/64.1; 428/64.2; 428/64.4; 428/64.8; 428/913; 430/270.1; 430/270.11; 430/270.14; 430/495; 430/945; 369/275.1; 369/283; 369/288
[58] Field of Search ............................. 428/1, 64.1, 64.2, 428/64.4, 64.8, 913; 430/270.1, 270.11, 270.14, 495, 945; 369/275.1, 283, 288

[56] References Cited

U.S. PATENT DOCUMENTS

| | | | |
|---|---|---|---|
| 4,702,558 | 10/1987 | Coles et al. | 350/330 |
| 4,702,945 | 10/1987 | Etzbach et al. | 428/1 |
| 4,963,448 | 10/1990 | Ichimura et al. | 430/20 |
| 5,024,850 | 6/1991 | Broer et al. | 428/1 |
| 5,124,183 | 6/1992 | Nakano et al. | 428/1 |
| 5,141,785 | 8/1992 | Yoshinada et al. | 428/1 |
| 5,162,545 | 11/1992 | Etzbach et al. | 548/426 |
| 5,212,027 | 5/1993 | Etzbach et al. | 430/20 |
| 5,279,932 | 1/1994 | Miyasaka et al. | 430/495 |
| 5,316,806 | 5/1994 | Yoshinaga et al. | 428/1 |
| 5,339,306 | 8/1994 | Yoshinaga et al. | 369/275.1 |

FOREIGN PATENT DOCUMENTS

| | | | |
|---|---|---|---|
| 350113 | 1/1990 | European Pat. Off. | C08G 63/68 |
| 422538 | 4/1991 | European Pat. Off. | C09B 69/00 |
| 550105 | 7/1993 | European Pat. Off. | C09K 19/38 |

OTHER PUBLICATIONS

Chemical Abstracts, vol. 115, 267076(c), abstracting Japanese Patent Publication No. 03/163,419 (Jul. 15, 1991).

*Primary Examiner*—Patrick Ryan
*Assistant Examiner*—Elizabeth Evans
*Attorney, Agent, or Firm*—Richard P. Fennelly; Louis A. Morris

[57] ABSTRACT

The invention pertains to an optical recording medium comprising a homeotropically oriented liquid crystalline polymer film having a $T_g$ between 75–100° C. and a $T_c$ between 110–140° C. and comprising at least one dichroic dye. This homeotropic orientation along with the presence of dichroic dye makes it possible to employ a different technique for writing out and reading data. For, in this case contrast is obtained by the dichroic dye contained in the film being aligned in the same direction as the mesogenic groups of the liquid crystalline polymer. In a virgin film the mesogenic groups, and hence the dichroic dye molecules, are oriented perpendicular to the film's surface, and there is only low absorption of the incident light by these molecules. By local heating or irradiation of the film (e.g., with a laser) the homeotropic orientation is converted to an isotropic one. In the case of an isotropically written trace, the dichroic dye will likewise be isotropically oriented, resulting in a substantially higher absorption of the incident light. The films according to the invention are suitable for use in analogue and digital optical data storage, as well as, of course, combined analogue/digital data storage.

2 Claims, 1 Drawing Sheet

OPTICAL RECORDING MEDIUM COMPRISING A HOMEOTROPICALLY ORIENTED LIQUID CRYSTALLINE POLYMER FILM COMPRISING DICHROIC DYE

This is a continuation-in-part application of U.S. Ser. No. 08/186,192, filed Jan. 24, 1994, now abandoned.

The invention pertains to an optical recording medium comprising a liquid crystalline polymer film comprising at least one dichroic dye. Such a polymer film has been described in European Patent Publication No. 422,538, which discloses dichroic dyes that may be used as building blocks for liquid crystalline polymers. These liquid crystalline polymers may be employed in optical information storage films. The liquid crystalline polymers described in said publication all have homogeneous planar and tangential orientation.

Another optical recording medium comprising liquid crystalline polymers is described in U.S. Pat. No. 4,702,945. Here, liquid crystalline polymers having $T_g$s varying from 26° C. to 55° C. are used. Dyes which may or may not be pleochroic are dissolved in the liquid crystalline polymer. No indication is given of the orientation of the liquid crystalline material.

The known films for optical recording media have failed, so far, to give optimum results. For instance, thick films must be used if sufficient contrast is to be obtained, and the use of such thick films requires a low writing speed. In addition, variations in film thickness frequently cause problems. The present invention solves or lessens these problems.

The invention pertains to an optical recording medium comprising a homeotropically oriented liquid crystalline polymer film wherein the liquid crystalline polymer, which comprises at least one dichroic dye, has a $T_g$ between 75° C. and 100° C. and a $T_c$ between 110° C. and 140° C.

By "homeotropically oriented" is meant that the mesogenic groups of the liquid crystalline polymer are oriented perpendicular to the surface of the film. This perpendicular orientation along with the presence of the dichroic dye makes it possible to employ a different technique for writing out and reading data.

For, in this case contrast is obtained by the dichroic dye contained in the film being aligned in the same direction as the mesogenic groups of the liquid crystalline polymer. Dichroic dyes will absorb one polarization direction of the light to a much greater extent than the other ones. Generally, this direction, averaged out on the basis of molecular movement, coincides with the long axis of the dye molecule. In a virgin film the mesogenic groups, and hence the dichroic dye molecules, are oriented perpendicular to the film's surface, and there is only low absorption of the incident light by these molecules. (It should be noted that the light's polarization direction is perpendicular to its propagation direction.) By local heating or irradiation (e.g., with a laser) the homeotropic orientation is converted to an isotropic one. As the irradiated or heated areas are cooled of rapidly (below the $T_g$ of the liquid crystalline polymer), the isotropic orientation is frozen in. In the case of an isotropically written trace, the dichroic dye will likewise be isotropically oriented and frozen in, resulting in a substantially higher absorption of the incident light. The reading takes place as a function of the absorption maximum of the dichroic dye at visible light, ultraviolet light, or infra-red light.

Employing this technique in optical data storage makes it possible to attain a high contrast, even for thin films. Because of the homeotropic orientation, reading may be carried out with unpolarised light, so polarisers, which not only are expensive, but also give low transmission at diazo wavelengths (approx. 410 nm), are not required. A further advantage of this writing/reading method is that there are no extremely high demands as to a homogeneous film thickness. The homeotropically oriented liquid crystalline films according to the invention are suitable for use in analogue and digital optical data storage, as well as, of course, combined analogue/digital data storage.

In U.S. Pat. No. 4,963,448 a photorecording element for use as a liquid crystalline cell (LC display) is described. A dichroic dye may be dispersed in the liquid crystalline material to induce color in the display. As the photorecording element is used for active switching, liquid crystalline material with low $T_g$s have to be used. These are, for instance, low molecular weight liquid crystals or low $T_g$ liquid crystalline polymers such as polysiloxanes or polyacrylates. The optical recording medium according to the invention is not meant for active switching, but rather for permanent (erasable or non-erasable) storage of information. As a consequence, the optical recording medium according to the invention is based on a totally different storage principle and has to fulfill different requirements for, for instance, $T_g$ and $T_c$.

U.S. Pat. No. 5,212,027 also describes a recording element for use as a liquid crystalline cell (LC. display). This element is based on ferroelectric smectic C* material, which can be switched back and forth between two thermodynamically stable smectic C* order states. For active switching low $T_g$ material has to be used. The $T_g$ of the materials used is about 50° C. In contrast to the material used in the recording medium of the present invention, the liquid crystalline material is chiral.

In U.S. Pat. No. 4,702,558 a liquid crystalline storage device is described comprising liquid crystalline polymers having $T_g$s below room temperature.

In the recording medium of the invention, the dichroic dye may be mixed into the liquid crystalline polymer or, alternatively, covalently bonded thereto. Another option is to use a liquid crystalline polymer of which the mesogenic group is itself dichroic. In that case, of course, there is no need to add a dichroic dye. Examples of such mesogenic groups are stilbene side groups and fully aromatic Schiff bases (i.e, an imine group, substituted on both sides with an aromatic ring.

In principle, any dichroic dye may be employed, providing it is sufficiently stable to be mixed into the polymer or bonded thereto. For the use in analog data storage, particular preference is given to ultraviolet light-absorbing dichroic dyes, since the described liquid crystalline films can be multiplied by means of diazo-copying. Examples of suitable dichroic dyes are D2, manufactured by Merck, and Sudan Orange G. For human readable storage visible dichroism is preferred from, for instance, D2 and Sudan Orange G.

For digital storage particular preference is given to near-infrared dichroic dyes to allow modulation of the film reflectance at appropriate near-infrared wavelength (780–820 nm). Suitable dichroic infrared dyes are crocomium dyes, squarilium dyes, and infrared azamethine dyes.

Suitable in principle are all liquid crystalline polymers transparent in the visible field which have a nematic or smectic-A phase between $T_g$ and $T_c$. The $T_g$ of the liquid crystalline polymer should lie between 75° C. and 110° C. If the $T_g$ is too close to the user's temperature, the written information, which is frozen in below $T_g$, may unintentionally be erased. With the use of liquid crystalline polymers having $T_g$s above 75° C. the information can be stored securely. The $T_c$ of the liquid crystalline polymer should be in the range of 110° C. to 140° C. It is of importance for the $T_c$ not to be too close to the decomposition temperature of the liquid crystalline polymer. Further, writing in a film with a high $T_c$ calls for a greater supply of energy. Finally, the difference between $T_g$ and $T_c$ should be at least 20° C. in order to obtain a satisfactory homogeneous homeotropic orientation. Examples include liquid crystalline polyesters, liquid crystalline polyurethanes, liquid crystalline polycarbonates, liquid crystalline poly(meth)acrylates, liquid crystalline polyimides, liquid crystalline polyamides, and liquid crystalline polyamidimides.

Particular preference is given to liquid crystalline side chain polyesters and liquid crystalline side chain polyurethanes, since they are easy to prepare and have tolerable thermal and chemical stability as well as passable UV irradiation resistance.

Pre-eminently suitable were found to be especially polyurethanes and polyesters having mesogenic groups according to formula 1 below:

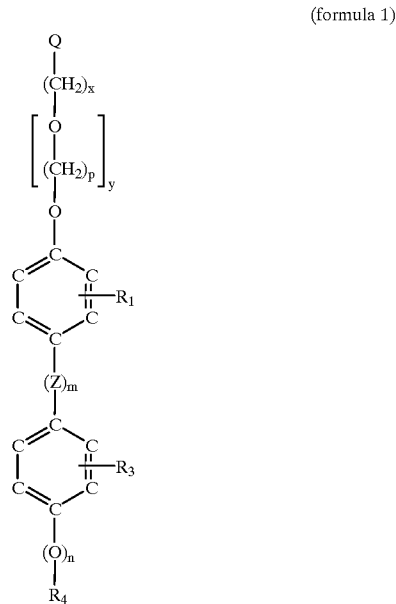

(formula 1)

wherein $R_1$=—halogen,

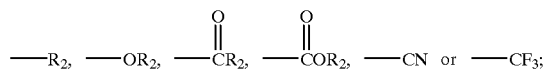

—$R_2$, —$OR_2$, —$CR_2$, —$COR_2$, —CN or —$CF_3$;

$R_2$=—H or an alkyl group having 1–3 carbon atoms;

$R_3$ may represent the same groups as $R_1$, but be selected independently from $R_1$;

Q stands for the monomer radical connecting the mesogenic group to the polymer main chain;

n is 0 or 1;

m is 0 or 1;

y is an integer from 0 through 3;

p is an integer from 2 through 4;

$R_4$=an alkyl group having 1–12 carbon atoms;

x is an integer from 0 through 6; and

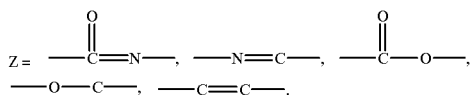

Z= —C=N—, —N=C—, —C—O—,
—O—C—, —C=C—.

Polyesters and polyurethanes having side groups according to formula 1 are so suitable in particular because by differing the spacer length and the length of alkyl group $R_4$ and using a mixture of diacid chlorides and diisocyanates, respectively, it is possible to exactly set the $T_g$ and the $T_c$. To this end reference is made to European Patent Publication No. 550,105. The techniques used in said document for setting the $T_g$ and the $T_c$ of these liquid crystalline polyurethanes apply equally in the case of the liquid crystalline polyesters having mesogenic groups according to formula 1. For the liquid crystalline polyurethanes' preparation and other information thereon, reference is also made to this application, which is to be considered incorporated herein by reference.

For the specific preparation of the liquid crystalline side chain polyesters reference is made to European Patent Publication No. 478,052.

A further advantage of the aforementioned polyesters and polyurethanes consists in their having dichroic side groups, if Z= —C=N—, —N=C—, and —C=C— in the ultraviolet wavelength area.

Ordinarily, a film is made by applying a solution of the polymer onto a substrate and evaporating the solvent. The suitable substrates include PET, PET-gold, PET-ITO, PET-Al, metal, glass, cellulose acetate, polycarbonate, polycarbonate-Al, silicon, etc. As a rule, films of a thickness of 0.5 to 10 micrometers are employed.

The liquid crystalline polymer may be homeotropically oriented in several ways:

1. By treating the substrate's surface with homeotropic orientation inducing surfactants, such as silanes, higher alcohols, and the like, e.g., n-dodecanol and Liquicoat J, from Merck.

2. By (corona) poling the liquid crystalline layer using a needle or a thin wire, or by using a substrate provided with an indium-tin-oxide (ITO) layer or some other conductive layer with which the poling field may be applied to the liquid crystalline layer. Alternatively, the liquid crystalline layer may be provided with a conductive layer on either side, and an electric field applied thereto.

3. By homeotropically orienting polymers with smectic-A orientation after lamination through passing the films over heated rollers. The resulting shear deformation causes the mesogenic groups to be homeotropically oriented.

When homeotropic films are produced by means of a surface treatment, the polymer film's viscosity and layer thickness are of importance.

When it is envisaged to employ a solid state laser for writing of data in analog storage, the liquid crystalline film has to be, or has to be made, infra-red light absorbing. In general, this is done by the mixing in or incorporating of an infra-red absorbing dye. It is advisable to have an infra-red absorbing dye which is barely oriented or not very dichroic, since in that case absorption during the writing process would be unsatisfactory. For that reason preference is given to infra-red absorbing dyes which do not have an elongated shape (e.g., molecules in platelet form or tetrahedra). Alternatively, an infra-red dichroic dye may be used which has its highest absorbency perpendicular to the molecular axis. Of course, in that case the use of an oriented dye is advisable.

For digital storage, in which both the writing and the reading is done in the infrared wavelength area, it is advisable to use an infrared dye which is dichroic. During writing a higher laser power (light intensity) is used, while during reading a lower laser power is used. For making compact disks which comply with the norm of background transmission of 70% and the written transmission being 40% of the background transmission, i.e., 28%, a dichroic ratio of at least 8.7 is required.

The invention will be illustrated with reference to the non-limiting Example below.

EXAMPLE

A croconium dye (CR) was prepared according to Example 4 of European Patent Publication No. 478,052.

A film consisting of a thin layer of a liquid crystalline polyester (LCP) according to Example 4 of European Patent Publication No. 350,113 with a diol of Example 1 and adipoyl chloride (approx. 0.5 mm thick) containing about 5% of the CR infrared dye on an Al-coated PET substrate was prepared by spin coating at 2000 rpm from a 20 wt % solution of the LCP and dye in cyclopentanone (n=5 mPa). After drying of approximately 24 hours the sample is homeotropically oriented using a corona polling process (V=6–10 kV, T=0–80° C.). This leads to a transparent homeotropic layer of liquid crystalline polyester.

A reflection spectrum of the obtained sample is shown in FIG. 1. The dominant reflections are in the ultraviolet wavelength area from the hydroxy-nitro-stilbene sidechains of the LCP and in the infrared wavelength area from the CR infrared dye. By making the sample isotropic above $T_c$, and cooling down rapidly to below $T_g$, an unoriented transparent isotropic film can be made. The spectrum of this film is also shown in FIG. 1. From the difference between the spectrum obtained from the homeotropic sample and the isotropic sample, it can be concluded that both the liquid crystalline side chain and the infrared dye show dichroism with a positive ratio. The observed effect can be used for data storage.

I claim:

1. An optical recording medium comprising a homeotropically oriented liquid crystalline polymer film wherein the liquid crystalline polymer, which comprises at least one dichroic dye, has a $T_g$ between 75° C. and 100° C. and a $T_c$ between 110° C. and 140° C.

2. An optical recording medium according to claim 1 wherein the liquid crystalline polymer is in the nematic or smectic-A phase between $T_g$ and $T_c$.

* * * * *